Patented May 12, 1931

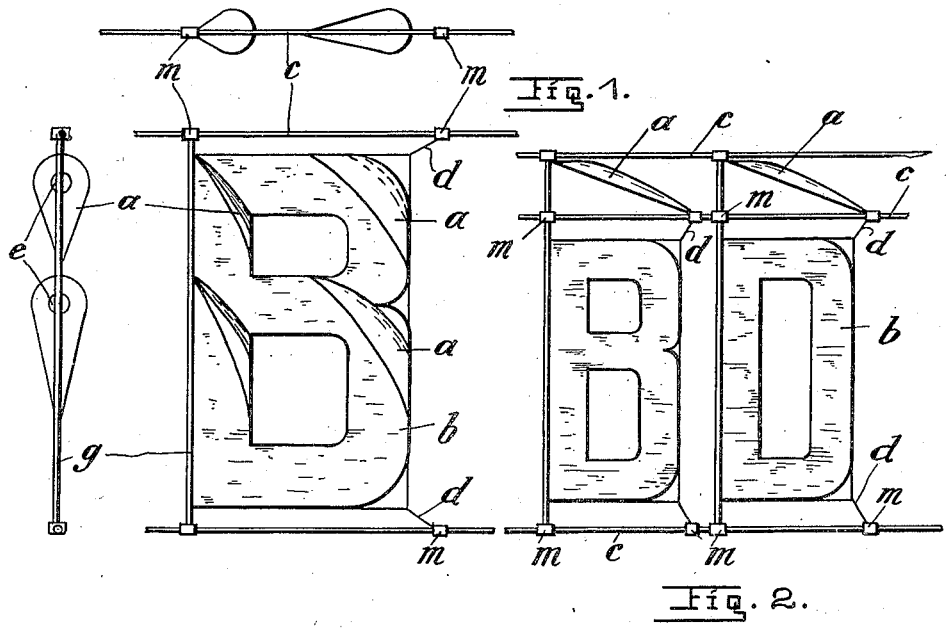
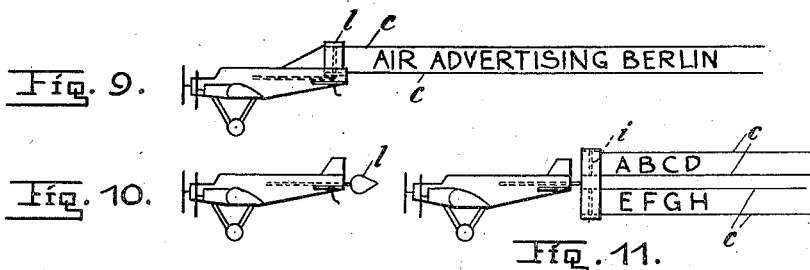
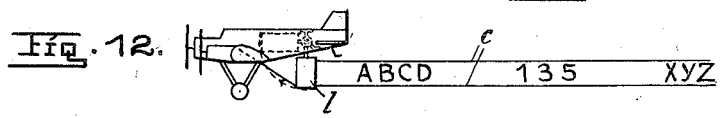
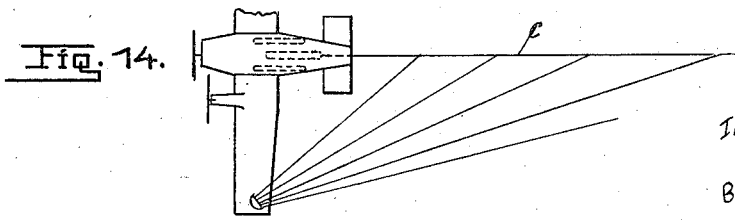

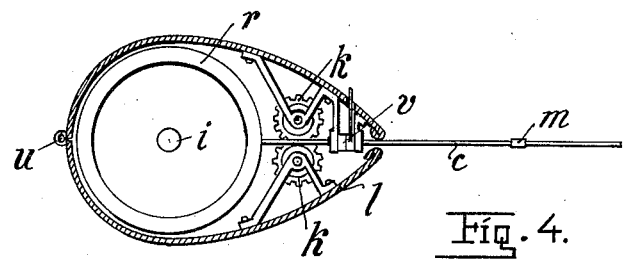
Fig. 4.
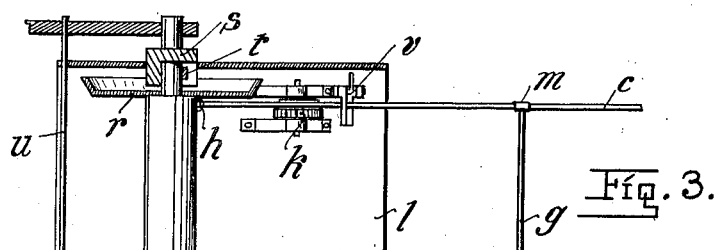
Fig. 3.
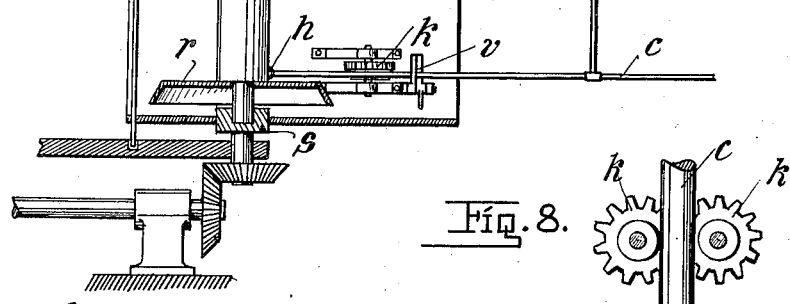
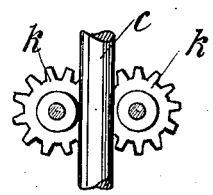
Fig. 8.
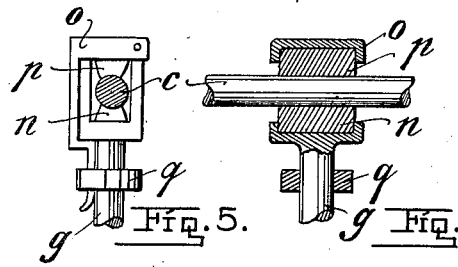
Fig. 5.   Fig. 6.    Fig. 7.
INVENTOR.
FRITZ NEUMEYER
BY
ATTORNEY.

1,805,002

UNITED STATES PATENT OFFICE

FRITZ NEUMEYER, OF BERLIN-CHARLOTTENBERG, GERMANY

LETTERS, FIGURES, AND SIGNS FOR EXHIBITION FROM AIRCRAFT

Application filed September 19, 1929, Serial No. 393,661, and in Germany September 21, 1928.

This invention relates to means for advertising from aircraft.

Hitherto, inter alia the following forms of aircraft advertising have been known:

1. Writing on or illuminating aircraft parts,
2. Using of chemical products for producing smoke-letters,
3. Hanging out of painted flags and strips.

All these known manners of advertising have disadvantages, because either only small words or signs can be displayed from the aircraft, when aircraft of normal size and power are used, or the costs are very heavy when larger or special types of aircraft or smoke-writing were used. In the latter case (smoke-writing), even in still weather the word is legible only for a very short time.

The objects of the invention are to provide means for advertising from aircraft by which the signs, letters, numerals or the like constituting the advertisement or message are visible for any desired period. The characters may be changed at will, the characters are always presented in a perpendicular and therefore easily observable position, the number of the characters constituting the sign may be varied as desired and may be practically unlimited.

The advantages of the present invention consist in that the writing lines are horizontal and the letter surfaces—with the outline effect of the separate letters—are perpendicular, and the letters appear of the same size and width independent of the size of the aircraft, and the number of the words is almost unlimited. Owing to these advantages, the result is that announcements of several words are at once clearly and plainly legible to large numbers of observers.

A further advantage consists in the fact that by means of illumination the writing in consequence of its large surface is also clearly legible at night and thus any alteration of the aircraft for night service is dispensed with. Furthermore, owing to the rapid manner in which the announcement can be changed, interest is continuously maintained. Owing to all these advantages, the actual range of advertising is exceeded and the sphere of military signalling and communication with officials and organizations becomes included.

These objects and advantages of the invention are attained in the following manner.

A framework of two or more wire lines is formed which is trailed from an aircraft. On these wire lines, the letters are fixed by means of special clamping devices and they are arranged as outlines one after the other in the desired sequence standing as letter surfaces either perpendicular or horizontal in the air following one another in the longitudinal axis of the aircraft or parallel thereto. In this way, one or more lines are produced, which are wound up on a roller and fitted in this condition in or on the aircraft. In order to protect them against the influence of weather, those rolls which are arranged outside the aircraft body, are covered with a protecting casing of stream line construction.

It is characteristic of the invention that the weight of the letters inclusive of the weight of the suspension device, is compensated by uplifting means so that the horizontal position of the lines is ensured up to the last letters.

Figure 1 shows in front and side elevation one of the advertising letters and its supporting parallel wires and stiffening members, the sustaining devices being attached to the latter;

Figure 2 is an elevation showing a modified form in which the sustaining devices are attached to the supporting framework for the letters;

Figure 3 is a sectional elevation showing the roller to which the advertising device is attached, the means for winding and unwinding the device on and off said roller, and the casing enclosing said roller;

Figure 4 is a similar view taken at right angles to Figure 3;

Figure 5 is a detail showing the manner of securing the parallel wires and stiffening members together;

Figure 6 is a sectional view of the same, taken at right angles to Figure 5;

Figures 7 and 8 are sectional views showing the rollers for guiding the advertising device during its winding up and unwinding operations;

Figure 9 is a diagrammatic view showing the device attached to an aircraft with the roller having its axis vertically at right angles to the longitudinal axis of the aircraft;

Figure 10 is another diagram showing the casing for the roller moved clear of the aircraft;

Figure 11 is also a diagram showing the use of two lines of advertising matter;

Figure 12 is another diagram illustrating another method of attachment in which the casing and roller is located below the longitudinal axis of the aircraft with its own axis perpendicularly at right angles thereto;

Figures 13 and 14 are diagrams showing the aircraft in side elevation and plan respectively and in which a plurality of rollers are arranged with their axes parallel to each other are provided.

One of the possible forms of construction, in which surfaces are used as uplifting means, is described below (Figure 1).

The uplifting surfaces $a$ are either fixed directly on the letters $b$ or form independent uplifting means above the letters (Figure 2). With the uplifting device which is arranged above the letter line $c$, so that the letters are suspended as flat surfaces, there is a combination of a set of uplifting surfaces arranged one behind the other.

The uplifting surface $a$ consists of woven material and is in general crescent-shaped where the back of the crescent may partly form a straight line. In its contour, it is so arranged that when blown out it does not affect the outline of the letter. Binding threads $d$ or the like are sewn in their free front edge turned to the wind, the length of which limits the size of the opening of the lifting surface in the blown up condition. The lifting surface, seen in the direction of flight, is so arranged right and left of the letter and at the same height that the front edge, that is, the crescent cutting edge, opens on coming into the wind met in travelling, while the back edge, that is the back of the crescent, is firmly fixed to the material of the letter surface. On the crescent backs openings $e$ may be provided permitting the flowing off of the air accumulated under the lifting surface.

The arrangement of the lifting surfaces on the letters can take place in many ways; providing always that the surfaces which are to produce the lifting effect should be arranged against the wind caused by travelling. The number of the crescent surfaces per letter depends upon the amount of the required lifting force.

The separate letter is cut out of a light but strong material the colour of which can be so chosen that during the day it is in contrast with the sky, and at night is clearly visible when illuminated. Binding threads $d$ or the like are sewn into all the edges of such a letter. These threads or cords extend with the outer outlines running in the perpendicular or inclined direction to both sides over the material. With curves or loops of the outer contours, the threads or cords leave the material on passing from the horizontal or perpendicular to the curves; at the point of intersection of the perpendicular, horizontal or inclined threads or strings coming out, these are firmly connected together on the side turned away from the aircraft and then run as a twisted double cord $f$ inclined backwards to the upper or lower wire cord $c$ in such manner that they form a stiffening of the letter surface.

The size of the letters is a few centimetres smaller than the distance apart of the two outside horizontal sustaining wires $c$—$c$.

At least one edge and this generally the front perpendicular letter edge, in the direction of travel, is stiffened by a bar $g$ or a thin tube, the upper and lower ends of which are fixed on the horizontal wire lines, horizontally running contour binding strings are wound round these perpendicular stiffening rods.

The sequence arrangement of the letters takes place by fastening them on two or more wire lines $c$—$c$ running parallel and distanced apart equal to the height of the letters. These wire lines carry at one end a hook which is hooked into an eye $h$ (Figure 3) which is connected, so that it cannot be unfastened, with the hollow spindle $i$ (Figure 3) of the winding up roller.

For the parallel guiding of the top and bottom wire lines, the following parts serve:

1. Perpendicular, thin rods or tubes $g$ which are arranged at definite distances from each other, but which, however, are generally replaced by the letter strengthening rods, and 2. A pair each of toothed guide wheel rollers $k$ (Figures 3 and 7), which are carried inside the protecting cover 1 above and below at the distance apart of the lowest and highest wire line $c$. Here one each toothed wheel roller is fitted at the top and one each at the bottom to the left and to the right hand half of the cover 1.

The single toothed wheel roller is in one half formed as a toothed wheel (Figures 7 and 8), while the other seen in section curved inwardly towards the hub.

With the two toothed wheel pairs, the narrowed parts lie towards the spindle ends of the rolling up roller and form, after engagement of the toothed wheel at the teeth engaging part, a groove serving to receive the wire line $c$ (Figure 7).

The means of connection $m$ between the letters and the wire lines (Figures 5 and 6) is at the ends of the perpendicular rods $g$, or of the twisted binding strings $f$ respectively; it forms a metal top with a groove which serves to receive the wire line c. As a bearing surface for the line a rubber cushion n is arranged in the lower part of the groove. After inserting the wire lines the other part of the groove is closed by a folding-in cover o which also has a rubber cushion p against the wire line. On this cover a pressure is exerted in the direction of the wire by means of a flat spring so that the wire line is firmly clamped between the rubber cushions and a displacement of the head in the longitudinal direction of the line is prevented. The blade spring bears on the shank of the head and is prevented from inadvertent opening by a ring q pushed over the end of the flat spring and the shank. This head is either screwed on to the perpendicular stiffening rod g, or it carries an eye for the attachment of the binding cord f.

It is a further characteristic of the invention that the whole arrangement above described—consisting of the wire lines with the letters attached thereto—be wound up on a roller. This roller consists of a hollow spindle i (Figure 3) to which is fitted concentrically at both ends a circular flange r with outwardly bent edges. The height of the letters used at the time controls the distance apart of the flanges. The diameter of the flanges is so calculated that it is somewhat larger than the outside diameter of the lines of letters c, c rolled up round the hollow spindle i.

The hollow spindle i is carried at both ends, and both the spindle ends are made tapered of square cross section, and fit into corresponding recesses of the throat or spur bearing s, s'; but in one of these bearings, one side of the square is cut away and is replaced by a wedge t. In order to be able to replace the one announcement roll by another, the wedge t is released whereby the spindle end at this point is released, and the roller can be drawn out of the other bearing.

The rolling up apparatuses are divided up into the following groups in accordance with the method of their attachment in or on aircraft:

1. The perpendicular roller or rollers
   (a) with aircraft mostly in the tail end or between or on the wings (Figure 9),
   (b) for very large letters or for multiple line announcements, a roller is carried, of corresponding length, behind the tail end, until attaining the necessary height, in the horizontal direction (Figure 10), in order to remain during the flight either in this direction or to be turned into the perpendicular direction (Figure 11),
   (c) with airships in or on the gondola ends, 2. As a roller which on the start is in any desired position in or on the body or in, on or under the wings, to be brought before the unrolling of the letters by means of a rod into the travelling wind, so that then the spindle of the roller is perpendicular (Figure 12).

Rollers according to 1 and 2 can with some forms of construction be exchanged during a flight, so that different announcements can be made without an intervening landing.

3. An arrangement of two or more rollers, the axes of which are arranged parallel to each other at the greatest possible distance apart in or on the body, and horizontal or perpendicular, and above which the described wire lines run in bands; here the letters are arranged in the desired combination before the flight, so that at least two rollers form a wire line set; if there are more lines then they are unrolled and rolled up again one after the other. The letters can be taken off the wire line arrangement during the flight, and be replaced by others so that there is a fresh announcement (Figures 13 and 14). Here also the line surface with the letters may be either arranged horizontally or perpendicularly.

The roller i is surrounded on all sides with a cover l the cross section of which is approximately of streamline shape. It is divided in the symmetrical plane; both halves are rotatable in hinges about a common axis u, so that the cover can be so far opened that it releases the roller with the wound up lines. During the flight, the cover is closed and the two cover halves are locked together. On the unrolling side at which the letter lines leave the cover or enter it again, the cover plate is bent inwards in such manner that the curve so produced represents a one-sided guide for the letter lines; at the same time, the curve serves for strengthening the cover halves.

In order, in cases of great danger, to give the aircraft pilot the possibility of freeing his craft at once from the attached lines, a disconnecting apparatus v is inserted in the protecting cover.

In order to prevent the wire lines c, c from unwinding too quickly so that the danger arises of a certain backward strain of the line, a brake is provided.

The rotating movement of the roller is produced either mechanically or by hand; with a mechanical drive, both a coupling with the motor as also a separate drive by means of a small wind screw, (as wind motor) may be used.

The combined working of the above described separate parts will now be more nearly explained in connection with an example of construction (Figure 12).

The separate letters b are fastened in the desired sequence by means of the clamping devices m on the extended wire lines c, c, and then the letter lines so formed are wound on the roller i. Several such rollers prepared with various announcements are arranged in the cabin of the aircraft. One of these rollers is, after opening the protecting cover $l$, inserted in its position $s$, $s'$ and then the cover is again closed and locked, care being taken that the last letter of the line hangs out of the protecting cover.

The start now takes place, and when the aircraft has attained the desired height, the protecting cover $l$ with the roller is brought by the swinging device out of the cabin under the aircraft into the wind current. The last letter already hanging out thereby opens its uplifting surfaces $a$ and the drag thus occasioned causes the letter line to unroll. The speed of the unrolling movement is regulated by the actuation of a coupling between the roller and the motor. By means of the lifting surfaces, the whole is blown out in a horizontal direction from the aircraft by means of the air.

After the announcement made visible in the manner described for the prescribed time, the letter lines are again rolled up by the reversing of the driving mechanism. If the separate letters in this movement become protected from the wind or are drawn into the interior of the protecting cover, and the supporting wind current is thus lost, then the uplifting surface $a$ rests against the letter surface $b$ so that the rolling up on the roller is possible.

The protecting cover with the roller is then swung back into the cabin, the protecting cover is opened, the roller is drawn out, and replaced by another when the outlined procedure starts again.

The announcements can be readily illustrated when desired by suitable lamps mounted in the ends of the wings or on any other suitable part of the aircraft.

What I claim and desire to secure by Letters Patent of the United States is:—

1. Means for advertising from aircraft comprising parallel wires, stiffening members therefor extending perpendicularly between said wires, characters individually attached to said wires, sustaining means for said characters, a roller and means for winding and unwinding the assembly of wires, stiffening members, and characters, on and off said roller.

2. Means for advertising from aircraft comprising parallel wires, stiffening members therefor extending perpendicularly between said wires, a plurality of characters individually and detachably secured to said wires, sustaining means associated with each of said characters, a roller and means for winding and unwinding the assembly of wires stiffening members, and characters, on and off said roller.

3. Means for advertising from aircraft comprising parallel wires, a plurality of characters individually and detachably secured at top and bottom to said wires, stiffening members for said wires and characters extending perpendicularly between said wires, sustaining means for each of said characters, a roller and means for winding and unwinding said assembly of wires, stiffening members, and characters, on and off said roller.

4. Means for advertising from aircraft comprising parallel wires, a plurality of characters individually and detachably secured at top and bottom to said wires, stiffening members for said wires and characters extending perpendicularly between said wires, sustaining means for each of said characters, a roller, means for winding and unwinding said assembly of wires, stiffening members, and characters, on and off said roller, and means for guiding said assembly during the winding and unwinding operations.

5. Means for advertising from aircraft comprising parallel wires, stiffening members therefor connected to and extending perpendicularly between said wires, a plurality of characters individually and detachably secured to said wires, sustaining members attached to each of said characters, a roller, means for rotating said roller to wind and unwind the assembly of wires and attached stiffening members and characters on and off said roller, guiding means for said assembly and a casing for enclosing said assembly when wound on said roller.

6. Means for advertising from aircraft comprising parallel wires, stiffening members therefor connected to and extending perpendicularly between said wires, a plurality of characters individually and detachably secured to said wires, sustaining members attached to each of said characters, a roller, means for rotating said roller to wind and unwind the assembly of wires and attached stiffening members and characters on and off said roller, guiding means for said assembly and an openable streamline casing for enclosing said assembly when wound on said roller.

7. The combination with an aircraft of advertising means comprising a roller rotatably mounted on a part of the aircraft structure, parallel wires attached at one of their ends to said roller, stiffening members for said wires extending perpendicularly between said wires, a plurality of characters individually attached to said wires, sustaining means for said characters and means for rotating said roller to wind and unwind the assembly of wires, stiffening members, and characters, on and off said roller.

8. The combination with an aircraft of advertising means comprising a roller mounted on a part of the aircraft structure, parallel wires attached at one of their ends to said roller, stiffening members for said wires connected to and extending between said wires to maintain them in parallel relation, a plurality of characters individually and detachably secured to said wires, sustaining means associated with each of said characters and means for winding and unwinding the assembly of wires, stiffening members, and characters, on and off said roller.

9. The combination with an aircraft of advertising means comprising a roller mounted on a part of the aircraft structure, parallel wires attached at one of their ends to said roller, a plurality of substantially rigid characters individually and detachably secured between and to said wires, sustaining means attached to each of said characters, and means for winding and unwinding the assembly of wires and characters on and off said roller.

10. The combination with an aircraft of advertising means comprising a rotatable roller mounted on a part of the aircraft structure, parallel wires attached at one of their ends to said roller, a plurality of characters individually and detachably secured to and between said wires, stiffening members for said wires and characters, sustaining means associated with each of said characters and means for winding and unwinding the assembly of wires, stiffening members, and characters, on and off said roller.

11. The combination with an aircraft of advertising means comprising a roller rotatably mounted on a part of the aircraft structure, parallel wires attached at one of their ends to said roller, stiffening members for said wires extending perpendicularly between said wires, a plurality of characters individually attached to said wires, sustaining means for said characters, means for rotating said roller to wind and unwind the assembly of wires, stiffening members, and characters, on and off said roller and means for guiding said assembly during the winding and unwinding operations.

12. The combination with an aircraft of advertising means comprising a roller mounted on a part of the aircraft structure, parallel wires attached at one of their ends to said roller, stiffening members for said wires connected to and extending between said wires to maintain them in parallel relation, a plurality of characters individually and detachably secured to said wires, sustaining means associated with each of said characters, means for winding and unwinding the assembly of wires, stiffening members, and characters, on and off said roller and a casing enclosing said assembly when wound on said roller.

13. The combination with an aircraft of advertising means comprising a roller rotatably mounted on a part of the aircraft structure, parallel wires attached at one of their ends to said roller, stiffening members for said wires extending perpendicularly between said wires, a plurality of characters individually attached to said wires, sustaining means for said characters, means for rotating said roller to wind and unwind the assembly of wires, stiffening members, and characters, on and off said roller, means for guiding said assembly during the winding and unwinding operations, and an openable casing enclosing said assembly when wound on said roller.

14. The combination with an aircraft of advertising means comprising a roller mounted on a part of the aircraft structure, parallel wires attached at one of their ends to said roller, a plurality of substantially rigid characters individually and detachably secured between and to said wires, sustaining means attached to each of said characters, means for winding and unwinding the assembly of wires and characters on and off said roller, means for guiding said assembly during the winding and unwinding operations and a casing enclosing said assembly when wound on said roller.

15. The combination with an aircraft of advertising means comprising a roller mounted on a part of the aircraft structure with its axis extending perpendicularly to the longitudinal axis of the aircraft, parallel wires attached at one of their ends to said roller, stiffening members for said wires extending perpendicularly between said wires, a plurality of characters individually attached to said wires, sustaining means for said characters and means for rotating said roller to wind and unwind the assembly of wires, stiffening members, and characters, on and off said roller.

16. The combination with an aircraft of advertising means comprising a roller mounted on a part of the aircraft structure with its axis extending perpendicularly to the longitudinal axis of the aircraft, parallel wires attached at one of their ends to said roller, a plurality of characters individually and detachably secured to and between said wires, stiffening members for said wires and characters, sustaining means associated with each of said characters and means for winding and unwinding the assembly of wires, stiffening members, and characters, on and off said roller.

17. The combination with an aircraft of advertising means therefor, a roller normally mounted on a part of the aircraft structure, means for moving said roller clear of the aircraft structure while still attached thereto, parallel wires attached at one of their ends to said roller, stiffening members for said wires extending perpendicularly between said wires, a plurality of characters individually attached to said wires, sustaining means for said characters and means for rotating said roller to wind and unwind the assembly of wires, stiffening members, and characters, on and off said roller.

18. The combination with an aircraft of advertising means comprising a roller normally mounted on a part of the aircraft structure with its axis transversely horizontal to the longitudinal axis of the aircraft, means for swinging said roller clear of the aircraft body with its axis vertically at right angles to the longitudinal axis of the aircraft, parallel wires attached at one of their ends to said roller, a plurality of characters individually and detachably secured to said wires, stiffening members for said wires extending perpendicularly between said wires, sustaining members for each of said characters, and means for winding and unwinding said assembly of wires, stiffening members, and characters, on and off said roller.

19. The combination with an aircraft of advertising means therefor, a roller normally mounted on a part of the aircraft structure, means for moving said roller clear of the aircraft structure while still attached thereto, parallel wires attached at one of their ends to said roller, a plurality of characters individually and detachably secured to and between said wires, stiffening members for said wires and characters, sustaining means associated with each of said characters and means for winding and unwinding the assembly of wires, stiffening members, and characters, on and off said roller.

20. The combination with an aircraft of advertising means therefor, a roller normally mounted on a part of the aircraft structure, means for moving said roller clear of the aircraft structure while still attached thereto, parallel wires attached at one of their ends to said roller, a plurality of characters individually and detachably secured to and between said wires, stiffening members for said wires and characters, sustaining means associated with each of said characters, means for winding and unwinding the assembly of wires, stiffening members, and characters, on and off said roller and means for guiding the assembly of wires, stiffening members and characters during the winding and unwinding operations.

FRITZ NEUMEYER.